United States Patent
Murayama et al.

(10) Patent No.: US 8,862,646 B1
(45) Date of Patent: Oct. 14, 2014

(54) DATA FILE DISCOVERY, VISUALIZATION, AND IMPORTING

(71) Applicant: PlusAMP, Inc., Tokyo (JP)

(72) Inventors: Toshihiro Murayama, Tokyo (JP); William Harris Yeskel, Tokyo (JP); Jonathan Epstein, Tokyo (JP)

(73) Assignee: PlusAmp, Inc., Tokyo (JP)

( * ) Notice: Subject to any disclaimer, the term of this patent is extended or adjusted under 35 U.S.C. 154(b) by 0 days.

(21) Appl. No.: 14/225,139

(22) Filed: Mar. 25, 2014

(51) Int. Cl.
  *G06F 17/30* (2006.01)
  *G06F 3/0484* (2013.01)

(52) U.S. Cl.
  CPC ...... *G06F 3/04842* (2013.01); *G06F 17/30126* (2013.01)
  USPC .......................................... 707/831; 715/835

(58) Field of Classification Search
  CPC   G06F 17/30126; G06F 3/048; G06F 3/04842
  USPC .................... 707/736, 831; 715/835
  See application file for complete search history.

(56) References Cited

U.S. PATENT DOCUMENTS

| | | | |
|---|---|---|---|
| 5,870,559 A * | 2/1999 | Leshem et al. ................. | 709/224 |
| 6,496,832 B2 | 12/2002 | Chi et al. | |
| 6,631,497 B1 * | 10/2003 | Jamshidi et al. .............. | 715/205 |
| 7,143,339 B2 | 11/2006 | Weinberg et al. | |
| 7,336,279 B1 * | 2/2008 | Takiguchi ..................... | 345/473 |
| 7,502,779 B2 | 3/2009 | Brockway et al. | |
| 7,599,988 B2 | 10/2009 | Frank | |
| 7,606,819 B2 * | 10/2009 | Audet et al. .......................... | 1/1 |
| 7,739,653 B2 | 6/2010 | Venolia | |
| 7,917,464 B2 | 3/2011 | Frank et al. | |
| 7,925,676 B2 | 4/2011 | Hogue et al. | |
| 8,015,183 B2 | 9/2011 | Frank | |
| 8,381,122 B2 * | 2/2013 | Louch et al. ................... | 715/784 |
| 8,402,382 B2 * | 3/2013 | Agarawala et al. ........... | 715/765 |
| 8,583,673 B2 | 11/2013 | Tarek et al. | |

(Continued)

FOREIGN PATENT DOCUMENTS

WO   WO-2013085727 A1   6/2013

OTHER PUBLICATIONS

"Introducing Microsoft SharePoint 2013: Analysis and Commentary on the Latest Version of Microsoft Sharepoint, as originally published on Intergen's Blog". *E-Book Portals, Content and Collaboration.* Intergen. Web. Sep. 15, 2012.

(Continued)

*Primary Examiner* — Jorge A Casanova
(74) *Attorney, Agent, or Firm* — Mintz Levin Cohn Ferris Glovsky and Popeo, P.C.

(57) ABSTRACT

Various data source locations storing files can be accessed and/or crawled. At each location, files can be identified. These files can be analyzed to obtain attributes characterizing such file. Thereafter, a visualization can be generated in a graphical user interface that takes the form of data map that characterizes the identified files along two or more dimensions, with each dimension being based on a different attribute of the file. For example, the vertical dimension can be based on a number of columns and the horizontal dimension can be based on a number of rows. The graphical user interface can include graphical user interface elements associated with each identified file. These elements, when activated, can cause complementary information characterizing the corresponding identified file to be displayed. The elements can then be used to import or otherwise utilize one of the identified files into an application (such as a spreadsheet software application.

33 Claims, 7 Drawing Sheets

(56) References Cited

U.S. PATENT DOCUMENTS

| | | | |
|---|---|---|---|
| 2006/0225000 A1* | 10/2006 | Albrecht et al. | 715/853 |
| 2008/0040665 A1* | 2/2008 | Waldeck | 715/277 |
| 2008/0059452 A1 | 3/2008 | Frank | |
| 2008/0140348 A1 | 6/2008 | Frank | |
| 2010/0131574 A1* | 5/2010 | Reese et al. | 707/812 |
| 2011/0283242 A1 | 11/2011 | Chew et al. | |
| 2012/0023101 A1 | 1/2012 | Heimendinger et al. | |
| 2012/0047134 A1 | 2/2012 | Hansson et al. | |
| 2012/0198388 A1* | 8/2012 | Santesteban | 715/849 |
| 2012/0254790 A1 | 10/2012 | Colombino et al. | |
| 2012/0265762 A1 | 10/2012 | Wade et al. | |
| 2013/0097563 A1* | 4/2013 | Pacheco Rodrigues Velho et al. | 715/850 |

OTHER PUBLICATIONS

"TIBCO Spotminer 8.2 User's Guider™." *TIBCO*.TIBCO Software Inc. Web. Nov. 2010.

Heft. "Microsoft Business Intelligence Power Tools". *Microsoft SQL Server Database Administration & Tools | SQL Server Pro*. Penton. Jan. 21, 2014. Web.

\* cited by examiner

Change the charts # of columns on vertical and date created on horizontal (in this case all files created since 5th – 15th of the month)

500

DATA FILE DISCOVERY, VISUALIZATION, AND IMPORTING

TECHNICAL FIELD

The subject matter described herein relates to discovery of data files across various storage locations and types and visualizations characterizing same. The current subject matter also provides enhanced techniques for selecting and importing of visualized files.

BACKGROUND

Entities ranging from individuals to large multi-national entities are generating increasing amounts of data files including files encapsulating tabular data. These files can be stored among various disparate locations including local storage, networked storage, email/email attachments, and in cloud-based storage services. Navigating and accessing such files becomes more burdensome as the number of files and their storage locations increase.

SUMMARY

In a first aspect, various data source locations storing files can be accessed and/or crawled. At each location, files taking various forms and/or their contents (e.g., tabular data) can be identified. Thereafter, a visualization can be generated in a graphical user interface that takes the form of data map that characterizes the identified files and/or tables along two or more dimensions, with each dimension being based on a different attribute of the file. For example, in the case of tabular data, the vertical dimension can be based on a number of columns and the horizontal dimension can be based on a number of rows. The size/shape/colors of elements can represent other dimensions. The graphical user interface can include graphical user interface elements associated with each identified file and/or table. These elements, when activated, can cause complementary information characterizing the corresponding identified file and/or table to be displayed. In addition, the elements can be used to import or otherwise utilize one of the identified files and/or tables into an application (such as statistical software). For example, such application can include a palette or other landing pad on which the corresponding graphical user interface elements can be dragged or otherwise exported from the data map for use by the application.

In an interrelated aspect, data source locations available to a user are crawled or accessed to identify files comprising data. Thereafter, each identified file is accessed to obtain attributes characterizing the file. A data map is then generated in a graphical user interface that characterizes the identified files along at least two dimensions. A first dimension is based on a first attribute of the corresponding identified file. A second dimension is based on a second attribute of the corresponding identified file, each identified file having a corresponding graphical user interface element. User-generated input is then received that activates one of the graphical user interface elements with a corresponding identified file. In response to the user-generated input, importation of the identified file corresponding to the activated graphical user interface element into an application is initiated.

In some variations, a size, shape, and/or color of each graphical user interface element is based on a different attribute or different attributes of the corresponding identified file and is visualized to convey a further dimension.

The data map can characterize the identified files along one or more other dimensions that are each based on a yet another attribute of the corresponding identified file.

The data within each identified file can include tabular data. For example, the data can be used to render/generate at least one pivot table. At least one identified data file can include two or more components with each component including data to generate a separate table (e.g., a pivot table, etc.). For example, a spreadsheet application file can comprise multiple sheets (each being a component) with different tables within each sheet. The current subject matter can be used to separately identify and characterize the sheets/tables. These components can be parsed from the identified file(s), and in some cases, persisted/stored for subsequent access.

Complementary information characterizing the corresponding identified file can be displayed in response to the user-generated input.

The data source locations can include, for example, local data stores, network accessible data stores, e-mail servers, and cloud-based data storage services.

The attributes can include, for example, identified file location, a number of rows, a number of columns, file size, file creation date, application that generated the identified file, file modification date, file access dates, number of times the file has been accessed, file type, author, data ranges, data formats, and keywords contained within the file.

The identified files can have file types such as .acv, .adp, .ai, .aif, .aiff, .air, .amp, .aod, .aps, .asc, .asf, .aspx, .att, .atf, .atx, .au, .avi, .aux, .bak, .bas, .bck, .bin, .bd, .bkf, .bmc, .bmp, .bud, .cbl, .cc, .cd, .cct, .cda, .cdd, .cdr, .cdt, .cdx, .cfm, .cfml, .clp, .cpp, .cs, .csproj, .cst, .csv, .ctl, .ctx, .cur, .cwf, .cxx, .dat, .db, .dbc, .dbf, .dbquery, .dbx, .dir, .doc, .docx, .dot, .dotm, .dotx, .drw, .dwf, .dwfx, .dwg, .dwt, .dxb, .dxf, .dxr, .eml, .eps, .eps2, .exe, .fla, .flk, .fly, .fm, .fp5, .fp7, .frm, .gvp, .gz, .gzip, .hlp, .ht, .htc, .htm, .html, hta, .iif, .img, .ind, .isd, .ism, .iso, .iss, .iwp, .jad, .jar, .java, .jfif, .jgw, .jhtm, .jhtml, .jnl, .job, .jpg, .jpeg, .js, .lab, .ldf, .ldif, .lgo, .lha, .lnk, .lock, .log1, .log2, .lzh, .mlv, .m2ts, .m3u, .m4a, .m4r, .map, .maq, .mar, .marc, .mat, .mco, .md5, .mdb, .mde, .mdf, .mdi, .mdmp, .mht, .mid, .mif, .mim, .mix, .mmap, .mod, .modd, .moff, .mot, .mov, .movie, .moz, .mpg, .mp3, .mp4, .mpe, .mpeg, .mpg, .mpt, .msg, .msdvd, .msg, .msi, .msm, .msp, .mst, .msv, .myd, .myi, .nch, .ncb, .nk2, .nn, .nrg, .nws, .o, .obj, .oca, .ocx, .odc, .oft, .ops, .opt, .pab, .pal, .par, .par2, .part, .pbm, .pce, pdd, .pde, .pdf, .pic, .pict, .pid, .pif, .pip, .pjp, .jpjeg, .pmd, .png, .pot, .ppm, .ppt, .prf, .prn, .ps, .psd, .psp, .pst, .pub, .qif, .qt, .r00, .r01, .r02, .r03, .r04, .r05, .ra, .ram, .rar, .raw, .rc, .rdi, .reg, .rm, .rpc, .rtf, .rtx, .sas, .sas7dbat, .sas7bvew, .sav, .sbl, .sbx, .scf, .scr, .sea, .sfx, .sh, .smi, .snd, .snp, .spo, .sps, .sql, .sqlite, .sqm, .stc, .std, .sti, .stm, .sv7, .sxc, .sxg, .sxm, .sxp, .sxw, .syd, .syo, .sys, .tab, .tar, .tif, .tiff, .tib, .tmb, .tmd, .tsv, .txt, .vb, .vbproj, .vbs, .vbx, .vcf, .vhd, .vm, .vsd, .vsi, .vsix, .vspscc, .vsscc, .vssscc, .wab, .wav, .wave, .wdb, .wer, .whb, .win, .wk1, .wk2, .wk3, .wk4, .wks, .wma, .wmv, .wms, .wmz, .wor, .wp, .wp2, .wp3, .wp4, .wpd, .wpp, .wps, .wpt, .prf, .wrj, .wrl, .wrz, .wtv, .wvf, .wvx, .xhtml, .xla, .xlam, .xlb, .xlc, .xld, .xlk, .xll, .xlm, .xlr, .xls, .xlsb, .xlsm, .xlsx, .xlt, .xltm, .xlv, .xlw, .xml, .xps, .xrp, .xsd, .xslt, .xspf, .xtf, .xxx, zip, .zipx, and .zix format files.

In a further interrelated aspect, data sources that are available to a user are accessed or crawled to identify files comprising data. Each identified file is later analyzed to obtain attributes characterizing the file. A data map can then be generated that characterizes the identified files along at least two dimensions. A first dimension is based on a first attribute of the corresponding identified file. A second dimension is based on a second attribute of the corresponding identified file.

Optionally, each identified file can have a corresponding graphical user interface element. Subsequently, user-generated input can be received that activates one of the graphical user interface elements with a corresponding identified file. In response, complementary information characterizing the corresponding identified file can be displayed in a graphical user interface.

In yet another interrelated aspect, data source locations that are available to a user are accessed or crawled to identify files comprising tabular data (i.e., one or more discrete tables, etc.). At least one of the files comprises at least two components each having a separate set of tabular data. Thereafter, each set of tabular data is analyzed to obtain attributes characterizing the corresponding set of tabular data. Thereafter, a data map is generated in a graphical user interface that characterizes the sets of tabular data along at least two dimensions. A first dimension is based on a first attribute of the corresponding set of tabular data. A second dimension is based on a second attribute of the corresponding set of tabular data. Each set of tabular data can have a corresponding and different graphical user interface element (for files with multiple components, each set of tabular data would have a different GUI element).

User-generated input selecting one of the elements can result in the corresponding set of tabular data to be imported into an application and/or it can cause complementary information characterizing the tabular data to be displayed.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the current subject matter provides an enhanced user experience in identifying and characterizing various data files and the use of same in various applications.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to methods, systems, apparatus, articles/computer program products for one or more of discovering, visualizing, and importing data tables from files among various data sources (having different locations and types within a larger network). While the foregoing sometimes refers to a platform, it will be appreciated that the functionality provided by such platform can embodied in different modalities.

Figure 1:
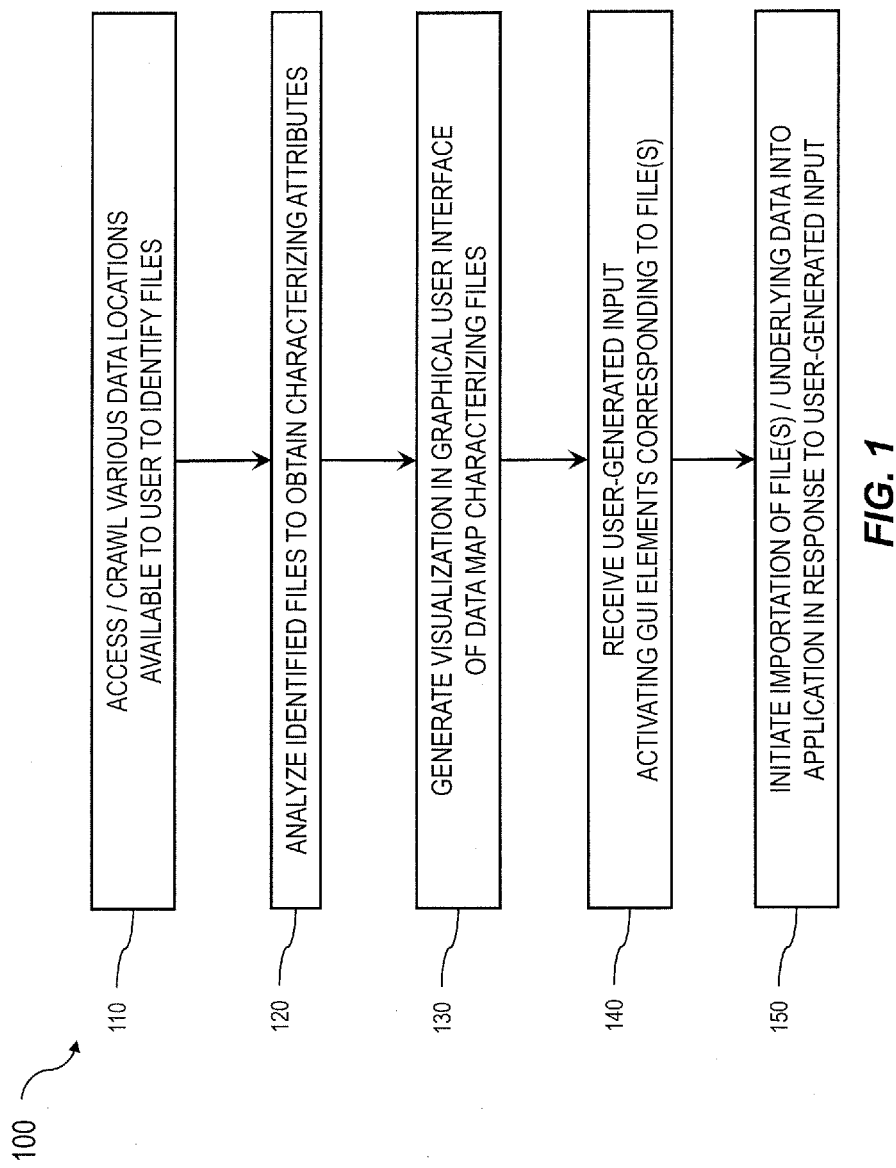
FIG. 1 is a process flow diagram illustrating discovery, visualization and importing of tabular data.

FIG. 1 is a process flow diagram 100 illustrating a method in which, at 110, various data source locations storing files can be accessed and/or crawled. At each location, files (e.g., files comprising tabular data) can be identified. Thereafter, at 120, the identified files can be analyzed to obtain attributes associated with each file. Subsequently, at 130, a visualization can be generated in a graphical user interface that takes the form of a visualization (sometimes referred to herein as a data map) that characterizes the identified files along two or more dimensions, with each dimension being based on a different attribute of the file. For example, if the identified file comprises tabular data, the vertical dimension can be based on a number of columns and the horizontal dimension can be based on a number of rows (and the visualization can characterize the tabular data as opposed to the identified file). The graphical user interface can include graphical user interface elements associated with each identified file. These elements, when activated, at 140, can optionally cause complementary information (e.g., one or more of the obtained attributes, etc.) characterizing the corresponding identified file to be displayed. In addition or in the alternative, the elements, at 150, can be optionally be activated to cause the identified file (or a portion thereof) to be import or otherwise utilized by an application (such as a statistical software application such as a spreadsheet software application). For example, such application can include a palette or other landing pad on which the elements can be dragged from the data map for use by the application.

The platform can initiate a discovery process by crawling through or otherwise accessing files associated with or otherwise available to a user. In some cases, all files associated or otherwise available to the user can be crawled/accessed, while in other cases, certain filters (keyword filtering, user authorization information, other contextual information, etc.) can be applied such that only a subset of such files can be crawled/accessed. The files can be available via different types of data sources and/or different locations. For example, the locations crawled can include local computer drives (relative to the user), network accessible drives, third party web accessible cloud storage services (e.g., DROPBOX, AMAZON, BOX, etc.), e-mail servers (e.g., OUTLOOK.COM, GMAIL, YAHOO, etc.) and the like. In some cases, such as the cloud storage services and e-mail servers, credentials such as username and password can be utilized to authenticate the user at such data locations.

The platform can discover a wide variety of file types. It will be appreciated that files can include structured data such as data files and also include unstructured data ranging from text documents to videos or music. Example file types (i.e., file formats) can include .acv, .adp, .ai, .aif, .aiff, .air, .amp, .aod, .aps, .asc, .asf, .aspx, .att, .atf, .atx, .au, .avi, .aux, .bak, .bas, .bck, .bin, .bd, .bkf, .bmc, .bmp, .bud, .cbl, .cc, .cd, .cct, .cda, .cdd, .cdr, .cdt, .cdx, .cfm, .cfml, .clp, .cpp, .cs, .csproj, .cst, .csv, .ctl, .ctx, .cur, .cwf, .cxx, .dat, .db, .dbc, .dbf, .dbquery, .dbx, .dir, .doc, .docx, .dot, .dotm, .dotx, .drw, .dwf, .dwfx, .dwg, .dwt, .dxb, .dxf, .dxr, .eml, .eps, .eps2, .exe, .fla, .flk, .fly, .fm, .fp5, .fp7, .frm, .gvp, .gz, .gzip, .hlp, .ht, .htc, .htm, .html, hta, .iif, .img, .ind, .isd, .ism, .iso, .iss, .iwp, .jad, .jar, .java, .jfif, .jgw, .jhtm, .jhtml, .jnl, .job, .jpg, .jpeg, .js, .lab, .ldf, .ldif, .lgo, .lha, .lnk, .lock, .log1, .log2, .lzh, .mlv, .m2ts, .m3u, .m4a, .m4r, .map, .maq, .mar, .marc, .mat, .mco, .md5, .mdb, .mde, .mdf, .mdi, .mdmp, .mht, .mid, .mif, .mim, .mix, .mmap, .mod, .modd, .moff, .mot, .mov, .movie, .moz, .mp2, .mp3, .mp4, .mpe, .mpeg, .mpg, .mpt, .msg, .msdvd, .msg, .msi, .msm, .msp, .mst, .msv, .myd, .myi, .nch, .ncb, .nk2, .nn, .nrg, .nws, .o, .obj, .oca, .ocx, .odc, .oft, .ops, .opt, .pab, .pal, .par, .par2, .part, .pbm, .pce, pdd, .pde, .pdf, .pic, .pict, .pid, .pif, .pip, .pjp, .jpjeg, .pmd, .png, .pot, .ppm, .ppt, .prf, .prn, .ps, .psd, .psp, .pst, .pub, .qif, .qt, .r00, .r01, .r02, .r03, .r04, .r05, .ra, .ram, .rar, .raw, .rc, .rdi, .reg, .rm, .rpc, .rtf, .rtx, .sas, .sas7dbat, .sas7bvew, .sav, .sbl, .sbx, .scf, .scr, .sea, .sfx, .sh, .smi, .snd, .snp, .spo, .sps, .sql, .sqlite, .sqm, .stc, .std, .sti, .stm, .sv7, .sxc, .sxg, .sxm, .sxp, .sxw, .syd, .syo, .sys, .tab, .tar, .tif, .tiff, .tib, .tmb, .tmd, .tsv, .txt, .vb, .vbproj, .vbs, .vbx, .vcf, .vhd, .vm, .vsd, .vsi, .vsix, .vspscc, .vsscc, .vssscc, .wab, .wav, .wave, .wdb, .wer, .whb, .win, .wk1, .wk2, .wk3, .wk4, .wks, .wma, .wmv, .wms, .wmz, .wor, .wp, .wp2, .wp3, .wp4, .wpd, .wpp, .wps, .wpt, .prf, .wrj, .wrl, .wrz, .wtv, .wvf, .wvx, .xhtml, .xla, .xlam, .xlb, .xlc, .xld, .xlk, .xll, .xlm, .xlr, .xls, .xlsb, .xlsm, .xlsx, .xlt, .xltm, .xlv, .xlw, .xml, .xps, .xrp, .xsd, .xslt, .xspf, .xtf, .xxx, zip, .zipx, and .zix format files and any other file type that can encapsulate data (such as tables).

For each file identified by the platform as part of the discovery process, the platform can obtain attributes characterizing the file. For example, metadata can be identified and cataloged (e.g., at a local or remote data store/indexed, etc.). The metadata can include, for example, file size, file type, location, program that generated the file, creation date, modified data, author, and the like.

The platform can also search and calculate the components of each file to derive other relevant attributes describing the content (which can be considered herein as attributes). For example, these attributes can include a number of times the file has been accessed, name of the organization/department, number of data columns, number of data rows, names of column titles, and statistics derived from the underlying data. In addition, usage statistics can be used such as the most recent time the file was accessed, the name of the individual who last accessed the file, the author of the file, the date that the file was created. Other information can be used including summaries of the contents of files, data ranges, date ranges, data formats, etc. Furthermore summaries of file attributes can be utilized.

The platform can also parse (or otherwise breakdown) each file into its major components (when applicable) and store/catalog each analyzed component separately. For example, an Excel file can comprise multiple sheets and tables, and each such sheet and table is referred to herein as a component. Components deriving from a single file can be analyzed separately. In the case of tabular data, the platform can identify and catalog column/row names and a number of columns/rows. In the case of .wav (or other audio file types) or video files, the platform can identify spoken or sung words, or otherwise characterize the audio portion of such files. In the case of text files, the platform can identify attributes such as numbers of sentences, paragraphs, language(s) used, types of speech, length of the document, and the like.

The platform can also identify the column names of tables and present a keyword cloud for the user to select relevant column names for further query. Column names can be indexed to a dictionary of commonly used terms, such that the platform can prioritize similar phrases/cognates in the presentation to the user. For example, the platform can identify that "P&L" and "Profit and Loss" refer to the same thing. Such an arrangement is advantageous as the process of identifying specific tables from a large variety of files is simplified and more intuitive from a user perspective.

The components can be stored locally at a client system and/or they can be stored remotely (for example, at a cloud-based storage host). The user can then interact with the stored components and use/combine the components for use by an application. The components can be stored locally, on a networked hard-drive, in cloud-storage and the like.

Figure 2:
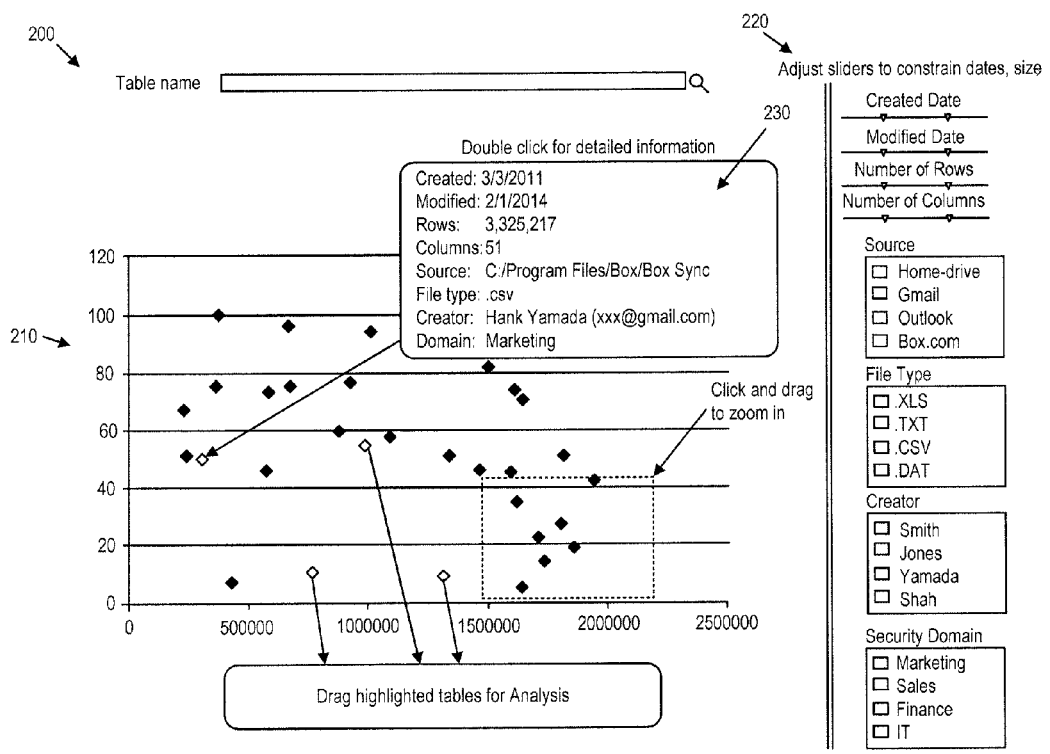
FIG. 2 is a first view of a data map visualization.

The attributes of the stored components can be visualized in differing manners. One example of a data map is illustrated in diagram 200 of FIG. 2. The data map of diagram 200 is a two dimensional scatter plot with the vertical and horizontal dimensions being based on different attributes of the corresponding identified files and/or tables. For example, the attributes can include, as described above, file attributes, location, number of rows/columns, file size, file creation/modification/access dates, as well as any other type of metadata or table/file statistics.

The data map of diagram 200 can be rendered in a graphical user interface (GUI) 210 that includes various GUI elements to allow a user to interact with the data map. The size, shape, color, and texture of the GUI elements can characterize other attributes of the corresponding identified file. In addition, in some cases, the data maps can be rendered in three or more dimensions (to reflect three or more attributes).

In some variations, the GUI 210 can allow to activate (e.g., click, hover over, etc.) a GUI element (e.g., a dot or other shape) so that complementary information 230 can be displayed (via a popup, bubble, text box, etc.) that characterizes the file/table. The complementary information to be viewed can be preset or user defined.

In some variations, the user, via a panel 220, can also filter the components (via sliders, checkboxes, input boxes, or simply visually on the chart by highlight a specific area). The panel 220 can, in some cases, be prepopulated with GUI elements that are based on attributes of the identified files. For example, a range for creation dates, a range for modified dates, a number of columns, a number of rows, the locations where the identified files reside, the identified file types, the creator of the identified files, the domain of the identified files, and the like. In some cases, a number corresponding to the number of identified files corresponding to each attribute can be displayed in the panel (as part of the GUI element or adjacent to it). In addition to filtering, an embedded search function (e.g., input box) can be used to select components that match specific criteria or search within the components for other characteristics.

Having narrowed down the components, the user can, by activating graphical user interface elements corresponding to the components/files, drag a GUI element that has been selected to another application (e.g., a spreadsheet software application) for analysis or use. For example, the GUI elements corresponding to dots on a scatter plot can be grabbed and dropped to an analytical screen for analysis (application icon, application launch pad, application palette, etc.). Other types of exporting techniques can be utilized including, for example, right clicking the GUI element (which causes a drop down menu to be rendered allowing the user to send the components/files to another application, etc.) and the like.

Figure 3:
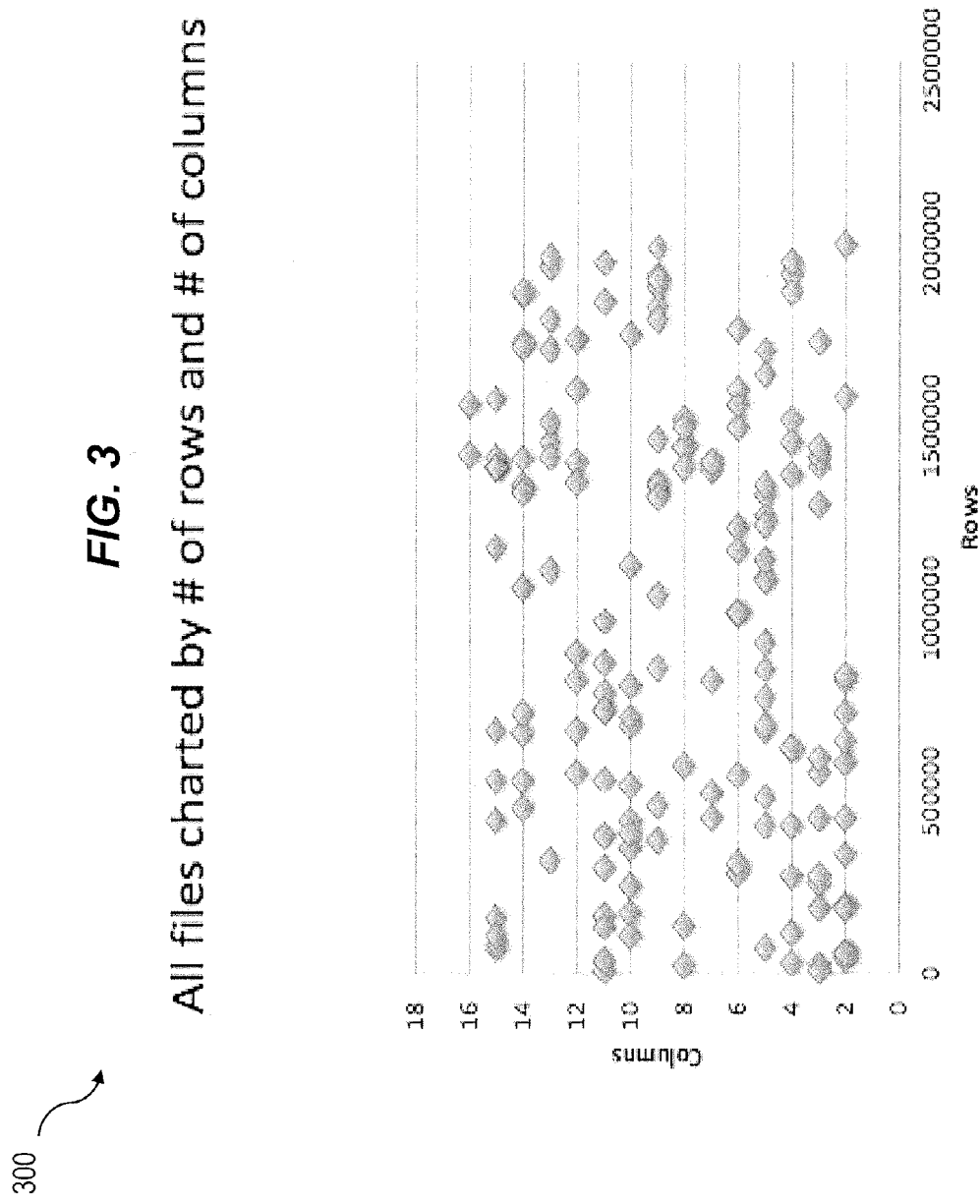
FIG. 3 is a second view of a data map visualization.
Figure 4:
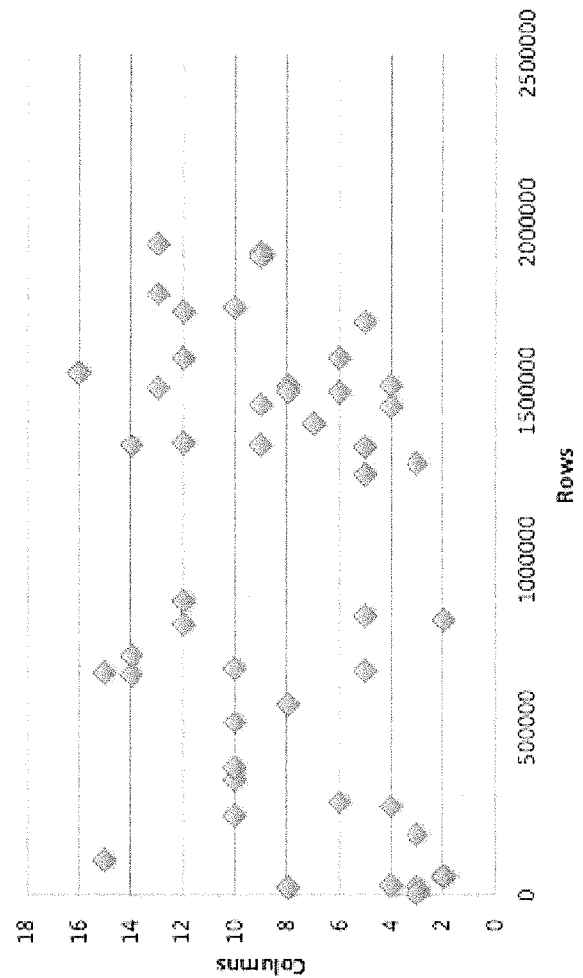
FIG. 4 is a third view of a data map visualization.
Figure 5:
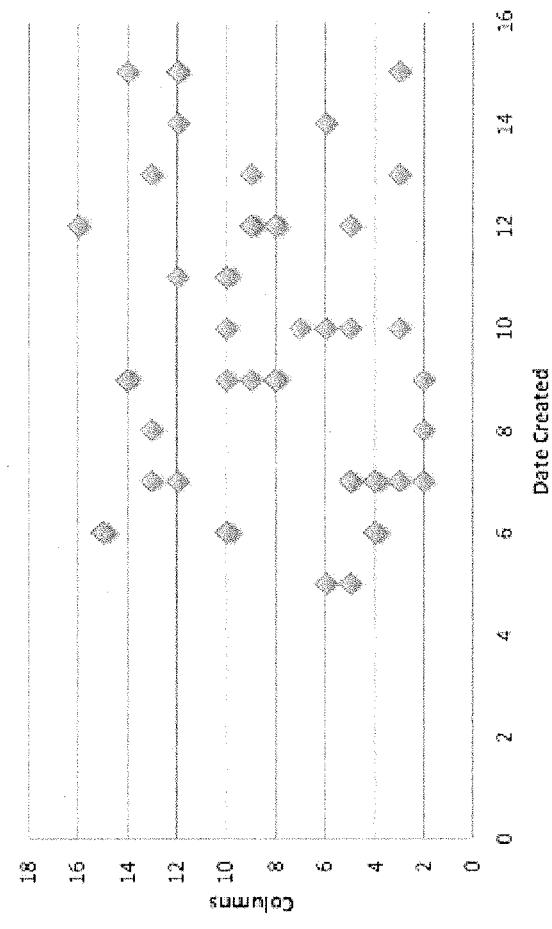
FIG. 5 is a fifth view of a data map visualization.
Figure 6:
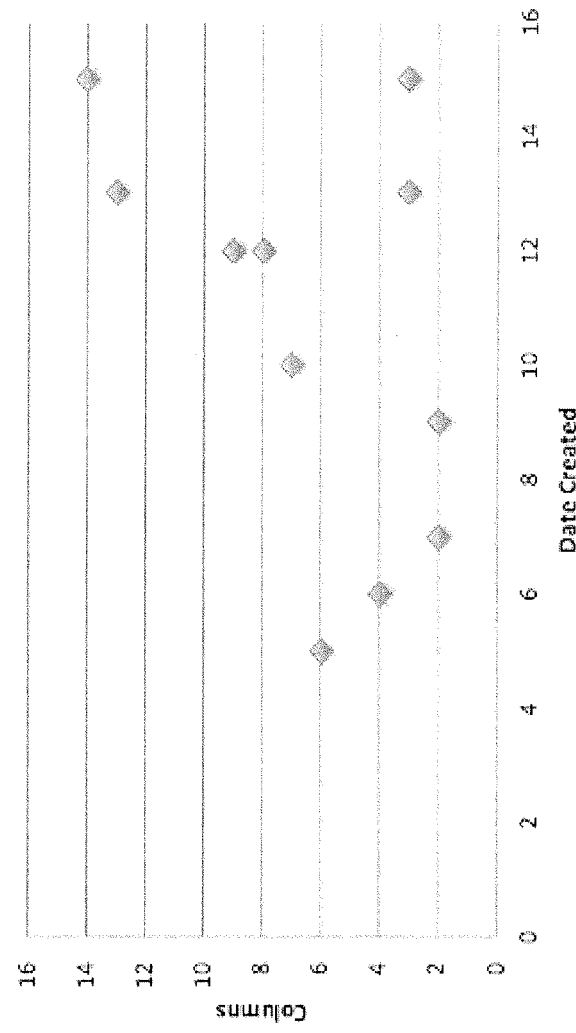
FIG. 6 is a sixth view of a data map visualization.

FIG. 3 is a diagram illustrating a data map 300 in which the files and/or tables are arranged corresponding to their respective number of columns and rows. FIG. 4 is a diagram including a data map 400 showing filtering of the files and/or tables illustrated in the data map 300 of FIG. 3; with such filtering being based, for example, on creation/modification/access date or the like (thereby resulting in fewer identified files and/or tables). FIG. 5 is a diagram 500 showing further filtering of the files and/or tables illustrated in the data map 400 of FIG. 4 (thereby resulting in fewer identified files and/or tables). FIG. 6 is a diagram 600 showing further filtering of the files and/or tables illustrated in the data map 500 of FIG. 5 (thereby resulting in fewer identified files and/or tables).

Figure 7:
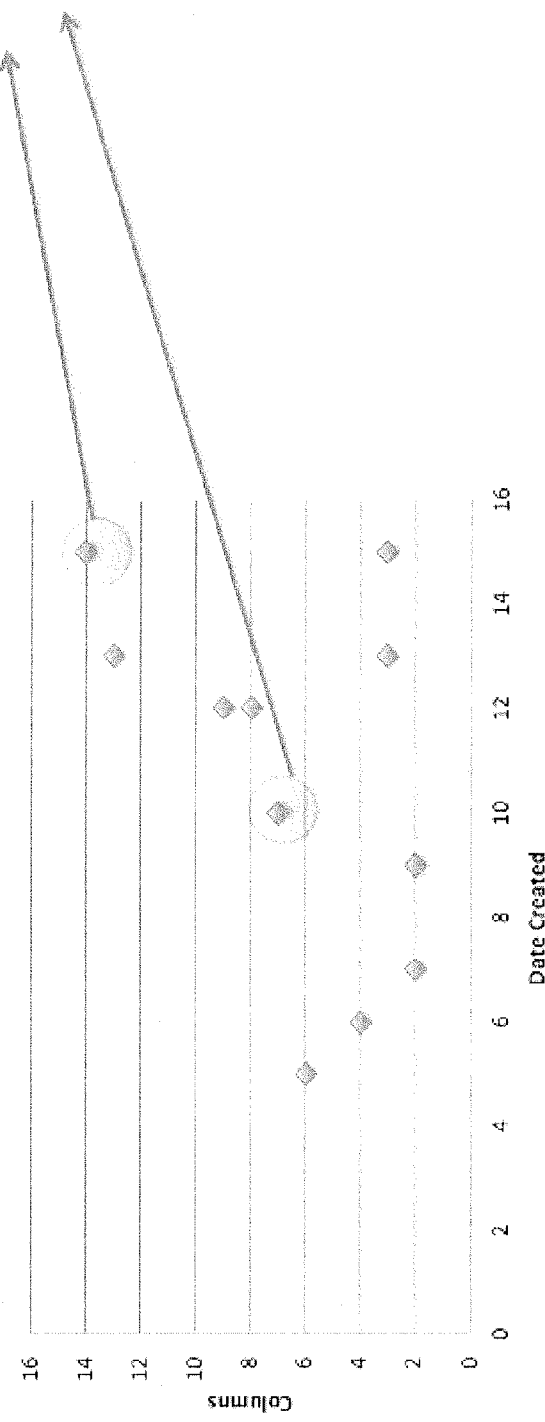
FIG. 7 is a seventh view of a data map visualization.

FIG. 7 is a diagram of a data map 700 illustrating importing of selected identified files and/or tables by dragging and dropping their corresponding GUI elements to an application. For example, the GUI element can be dragged and dropped onto an icon associated with the application, a launch pad associated with the application, and/or a palette or other workspace associated with the application.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic discs, optical disks, memory, and Programmable Logic Devices (PLDs), used to provide machine instructions and/or data to a programmable data processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method for implementation by one or more data processors forming part of at least one computing system, the method comprising:
   accessing or crawling, by at least one data processor, data source locations available to a user to identify files comprising data;
   analyzing, by at least one data processor, each identified file to obtain attributes characterizing the file;
   generating, by at least one data processor in a graphical user interface, a data map characterizing the identified files along at least two dimensions, a first dimension being based on a first attribute of the corresponding identified file, a second dimension being based on a second attribute of the corresponding identified file, each identified file having a corresponding graphical user interface element, wherein the first attribute comprise a number of rows of a corresponding table and the second attribute comprises a number of columns of the corresponding table;

receiving, by at least one data processor, user-generated input activating one of the graphical user interface elements with a corresponding identified file; and initiating, by at least one data processor, importation of the identified file corresponding to the activated graphical user interface element into an application;

wherein at least one identified file is individually parsed into two or more components, the attributes are obtained for each component and each component has a different corresponding graphical user interface element within the data map.

2. A method as in claim 1, wherein a size and/or color of each graphical user interface element is based on a further attribute of the corresponding identified file that is different from the first attribute and the second attribute.

3. A method as in claim 1, wherein a shape of each graphical user interface element is based on a further attribute of the corresponding identified file that is different from the first attribute and the second attribute.

4. A method as in claim 1, wherein the data map characterizes the identified files along at least one other dimension with each dimension being based on a different attribute of the corresponding identified file.

5. A method as in claim 1, wherein the data within each identified file comprises tabular data.

6. A method as in claim 1, further comprising: displaying, by at least one data processor, complementary information characterizing the corresponding identified file in response to the user-generated input.

7. A method as in claim 1, wherein the data source locations are selected from a group consisting of: local data stores, network accessible data stores, e-mail servers, and cloud-based data storage services.

8. A method as in claim 1, wherein the attributes are selected from a group consisting of: identified file location, a number of rows, a number of columns, file size, file creation date, application that generated the identified file, file modification date, file access dates, number of times the file has been accessed, file type, author, data ranges, data formats, and keywords contained within the file.

9. A method as in claim 1, wherein the data comprises data to render at least one pivot table.

10. A method as in claim 1, wherein each component comprises a separate set of tabular data.

11. A method as in claim 1, wherein the identified files have types selected from a group consisting of: .acv, .adp, .ai, .aif, .aiff, .air, .amp, .aod, .aps, .asc, .asf, .aspx, .att, .atf, .atx, .au, .avi, .aux, .bak, .bas, .bck, .bin, .bd, .bkf, .bmc, .bmp, .bud, .cbl, .cc, .cd, .cct, .cda, .cdd, .cdr, .cdt, .cdx, .cfm, .cfml, .clp, .cpp, .cs, .csproj, .cst, .csv .ctl, .ctx, .cur, .cwf, .cxx, .dat, .db, .dbc, .dbf, .dbquery, .dbx, .dir, .doc, .docx, .dot, .dotm, .dotx, .drw, .dwf, .dwfx, .dwg, .dwt, .dxb, .dxf, .dxr, .eml, .eps, .eps2, .exe, .fla, .flk, .fly, .fm, .fp5, .fp7, .frm, .gvp, .gz, .gzip, .hlp, .ht, .htc, .htm, .html, hta, .iif, .img, .ind, .isd, .ism, .iso, .iss, .iwp, .jad, .jar, .java, .jfif, .jgw, .jhtm, .jhtml, .jnl, .job, .jpg, .jpeg, .js, .lab, ldf, .ldif, .lgo, .lha, .lit, .lnk, .lock, .log1, .log2, .lzh, .mlv, .m2ts, .m3u, .m4a, .m4r, .map, .maq, .mar, .marc, .mat, .mco, .md5, .mdb, .mde, .mdf, .mdi, .mdmp, .mht, .mid, .mif, .mim, .mix, .mmap, .mod, .modd, .moff, .mot, .mov, .movie, .moz, .mp2, .mp3, .mp4, .mpe, .mpeg, .mpg, .mpt, .msg, .msdvd, .msg, .msi, .msm, .msp, .mst, .msv, .myd, .myi, .nch, .ncb, .nk2, .nn, .nrg, .nws, .o, .obj, .oca, .ocx, .odc, .oft, .ops, .opt, .pab, .pal, .par, .par2, .part, .pbm, .pce, pdd, .pde, .pdf, .pic, .pict, .pid, .pif, .pip, .pjp, .jpjeg, .pmd, .png, .pot, .ppm, .ppt, .prf, .prn, .ps, .psd, .psp, .pst, .pub, .qif, .qt, .r00, .r01, .r02, .r03, .r04, .r05, .ra, .ram, .rar, .raw, .rc, .rdi, .reg, .rm, .rpc, .rtf, .rtx, .sas, .sas7dbat, .sas7bvew, .sav, .sbl, .sbx, .scf, .scr, .sea, .sfx, .sh, .smi, .snd, .snp, .spo, .sps, .sql, .sqlite, .sqm, .stc, .std, .sti, .stm, .sv7, .sxc, .sxg, .sxm, .sxp, .sxw, .syd, .syo, .sys, .tab, .tar, .tif, .tiff, .tib, .tmb, .tmd, .tsv, .txt, .vb, .vbproj, .vbs, .vbx, .vcf, .vhd, .vm, .vsd, .vsi, .vsix, .vspscc, .vsscc, .vssscc, .wab, .wav, .wave, .wdb, .wer, .whb, .win, .wk1, .wk2, .wk3, .wk4, .wks, .wma, .wmv, .wms, .wmz, .wor, .wp, .wp2, .wp3, .wp4, .wpd, .wpp, .wps, .wpt, .prf, .wrj, .wrl, .wrz, .wtv, .wvf, .wvx, .xhtml, .xla, .xlam, .xlb, .xlc, .xld, .xlk, .xll, .xlm, .xlr, .xls, .xlsb, .xlsm, .xlsx, .xlt, .xltm, .xlv, .xlw, .xml, .xps, .xrp, .xsd, .xslt, .xspf, .xtf, .xxx, zip, .zipx, and .zix format files.

12. A non-transitory computer program product storing instructions which, when executed by one or more data processors forming part of at least one computing system, result in operations comprising:

accessing or crawling, by at least one data processor, data source locations available to a user to identify files comprising data;

analyzing, by at least one data processor, each identified file to obtain attributes characterizing the file;

generating, by at least one data processor in a graphical user interface, a data map characterizing the identified files along at least two dimensions, a first dimension being based on a first attribute of the corresponding identified file, a second dimension being based on a second attribute of the corresponding identified file, each identified file having a corresponding graphical user interface element, wherein the first attribute comprise a number of rows of a corresponding table and the second attribute comprises a number of columns of the corresponding table;

receiving, by at least one data processor, user-generated input activating one of the graphical user interface elements with a corresponding identified file; and initiating, by at least one data processor, importation of the identified file corresponding to the activated graphical user interface element into an application;

wherein at least one identified file is individually parsed into two or more components, the attributes are obtained for each component and each component has a different corresponding graphical user interface element within the data map.

13. A computer program product as in claim 12, wherein a size and/or color of each graphical user interface element is based on a further attribute of the corresponding identified file that is different from the first attribute and the second attribute.

14. A computer program product as in claim 12, wherein a shape of each graphical user interface element is based on a further attribute of the corresponding identified file that is different from the first attribute and the second attribute.

15. A computer program product as in claim 12, wherein the data map characterizes the identified files along at least one other dimension with each dimension being based on a different attribute of the corresponding identified file.

16. A computer program product as in claim 12, wherein the data within each identified file comprises tabular data.

17. A computer program product as in claim 12, wherein the operations further comprise: displaying, by at least one data processor, complementary information characterizing the corresponding identified file in response to the user-generated input.

18. A computer program product as in claim 12, wherein the data source locations are selected from a group consisting of: local data stores, network accessible data stores, e-mail servers, and cloud-based data storage services.

19. A computer program product as in claim 12, wherein the attributes are selected from a group consisting of: identified file location, a number of rows, a number of columns, file size, file creation date, application that generated the identified file, file modification date, file access dates, number of times the file has been accessed, file type, author, data ranges, data formats, and keywords contained within the file.

20. A computer program product as in claim 12, wherein the data comprises data to render at least one pivot table.

21. A computer program product as in claim 12, wherein each component comprises a separate set of tabular data.

22. A computer program product as in claim 12, wherein the identified files have types selected from a group consisting of: .acv, .adp, .ai, .aif, .aiff, .air, .amp, .aod, .aps, .asc, .asf, .aspx, .att, .atf, .atx, .au, .avi, .aux, .bak, .bas, .bck, .bin, .bd, .bkf, .bmc, .bmp, .bud, .cbl, .cc, .cd, .cct, .cda, .cdd, .cdr, .cdt, .cdx, .cfm, .cfml, .clp, .cpp, .cs, .csproj, .cst, .csv .ctl, .ctx, .cur, .cwf, .cxx, .dat, .db, .dbc, .dbf, .dbquery, .dbx, .dir, .doc, .docx, .dot, .dotm, .dotx, .drw, .dwf, .dwfx, .dwg, .dwt, .dxb, .dxf, .dxr, .eml, .eps, .eps2, .exe, .fla, .flk, .fly, .fm, .fp5, .fp7, .form, .gvp, .gz, .gzip, .hlp, .ht, .htc, .htm, .html, hta, .iif, .img, .ind, .isd, .ism, .iso, .iss, .iwp, .jad, .jar, .java, .jfif, .jgw, .jhtm, .jhtml, .jnl, .job, .jpg, .jpeg, .js, .lab, .ldf, .ldif, lgo, .lha, .lit, .lnk, .lock, .log1, .log2, .lzh, .m1v, .m2ts, .m3u, .m4a, .m4r, .map, .maq, .mar, .marc, .mat, .mco, .md5, .mdb, .mde, .mdf, .mdi, .mdmp, .mht, .mid, .mif, .mim, .mix, .mmap, .mod, .modd, .moff, .mot, .mov, .movie, .moz, .mp2, .mp3, .mp4, .mpe, .mpeg, .mpg, .mpt, .msg, .msdvd, .msg, .msi, .msm, .msp, .mst, .msv, .myd, .myi, .nch, .ncb, .nk2, .nn, .nrg, .nws, .o, .obj, .oca, .ocx, .odc, .oft, .ops, .opt, .pab, .pal, .par, .par2, .part, .pbm, .pce, pdd, .pde, .pdf, .pic, .pict, .pid, .pif, .pip, .pjp, .jpjeg, .pmd, .png, .pot, .ppm, .ppt, .prf, .prn, .ps, .psd, .psp, .pst, .pub, .qif, .qt, .r00, .r01, .r02, .r03, .r04, .r05, .ra, .ram, .rar, .raw, .rc, .rdi, .reg, .rm, .rpc, .rtf, .rtx, .sas, .sas7dbat, .sas7bvew, .sav, .sbl, .sbx, .scf, .scr, .sea, .sfx, .sh, .smi, .snd, .snp, .spo, .sps, .sql, .sqlite, .sqm, .stc, .std, .sti, .stm, .sv7, .sxc, .sxg, .sxm, .sxp, .sxw, .syd, .syo, .sys, .tab, .tar, .tif, .tiff, .tib, .tmb, .tmd, .tsv, .txt, .vb, .vbproj, .vbs, .vbx, .vcf, .vhd, .vm, .vsd, .vsi, .vsix, .vspscc, .vsscc, .vssscc, .wab, .wav, .wave, .wdb, .wer, .whb, .win, .wk1, .wk2, .wk3, .wk4, .wks, .wma, .wmv, .wms, .wmz, .wor, .wp, .wp2, .wp3, .wp4, .wpd, .wpp, .wps, .wpt, .prf, .wrj, .wrl, .wrz, .wtv, .wvf, .wvx, .xhtml, .xla, .xlam, .xlb, .xlc, .xld, .xlk, .xll, .xlm, .xlr, .xls, .xlsb, .xlsm, .xlsx, .xlt, .xltm, .xlv, .xlw, .xml, .xps, .xrp, .xsd, .xslt, .xspf, .xtf, .xxx, zip, .zipx, and .zix format files.

23. A system comprising:
one or more data processors; and
memory storing instructions which, when executed by the one or more data processors, result in operations comprising:
accessing or crawling data source locations available to a user to identify files comprising data;
analyzing each identified file to obtain attributes characterizing the file;
generating, in a graphical user interface, a data map characterizing the identified files along at least two dimensions, a first dimension being based on a first attribute of the corresponding identified file, a second dimension being based on a second attribute of the corresponding identified file, each identified file having a corresponding graphical user interface element, wherein the first attribute comprise a number of rows of a corresponding table and the second attribute comprises a number of columns of the corresponding table;
receiving user-generated input activating one of the graphical user interface elements with a corresponding identified file; and initiating importation of the identified file corresponding to the activated graphical user interface element into an application;
wherein at least one identified file is individually parsed into two or more components, the attributes are obtained for each component and each component has a different corresponding graphical user interface element within the data map.

24. A system as in claim 23, wherein a size and/or color of each graphical user interface element is based on a further attribute of the corresponding identified file that is different from the first attribute and the second attribute.

25. A system as in claim 23, wherein a shape of each graphical user interface element is based on a further attribute of the corresponding identified file that is different from the first attribute and the second attribute.

26. A system as in claim 23, wherein the data map characterizes the identified files along at least one other dimension with each dimension being based on a different attribute of the corresponding identified file.

27. A system as in claim 23, wherein the data within each identified file comprises tabular data.

28. A system as in claim 23, wherein the operations further comprise:
displaying, by at least one data processor, complementary information characterizing the corresponding identified file in response to the user-generated input.

29. A system as in claim 23, wherein the data source locations are selected from a group consisting of: local data stores, network accessible data stores, e-mail servers, and cloud-based data storage services.

30. A system as in claim 23, wherein the attributes are selected from a group consisting of: identified file location, a number of rows, a number of columns, file size, file creation date, application that generated the identified file, file modification date, file access dates, number of times the file has been accessed, file type, author, data ranges, data formats, and keywords contained within the file.

31. A system as in claim 23, wherein the data comprises data to render at least one pivot table.

32. A system as in claim 23, wherein each component comprises a separate set of tabular data.

33. A system as in claim 23, wherein the identified files have types selected from a group consisting of: .acv, .adp, .ai, .aif, .aiff, .air, .amp, .aod, .aps, .asc, .asf, .aspx, .att, .atf, .atx, .au, .avi, .aux, .bak, .bas, .bck, .bin, .bd, .bkf, .bmc, .bmp, .bud, .cbl, .cc, .cd, .cct, .cda, .cdd, .cdr, .cdt, .cdx, .cfm, .cfml, .clp, .cpp, .cs, .csproj, .cst, .csv .ctl, .ctx, .cur, .cwf, .cxx, .dat, .db, .dbc, .dbf, .dbquery, .dbx, .dir, .doc, .docx, .dot, .dotm, .dotx, .drw, .dwf, .dwfx, .dwg, .dwt, .dxb, .dxf, .dxr, .eml, .eps, .eps2, .exe, .fla, .flk, .fly, .fm, .fp5, .fp7, .frm, .gvp, .gz, .gzip, .hlp, .ht, .htc, .htm, .html, hta, .iif, .img, .ind, .isd, .ism, .iso, .iss, .iwp, .jad, .jar, .java, .jfif, .jgw, .jhtm, .jhtml, .jnl, .job, .jpg, .jpeg, .js, .lab, .ldf, .ldif, .lgo, .lha, .lit, lnk, .lock, .log1, .log2, .lzh, .m1v, .m2ts, .m3u, .m4a, .m4r, .map, .maq, .mar, .marc, .mat, .mco, .md5, .mdb, .mde, .mdf, .mdi, .mdmp, .mht, .mid, .mif, .mim, .mix, .mmap, .mod, .modd, .moff, .mot, .mov, .movie, .moz, .mp2, .mp3, .mp4, .mpe, .mpeg, .mpg, .mpt, .msg, .msdvd, .msg, .msi, .msm, .msp, .mst, .msv, .myd, .myi, .nch, .ncb, .nk2, .nn, .nrg, .nws, .o, .obj, .oca, .ocx, .odc, .oft, .ops, .opt, .pab, .pal, .par, .par2, .part, .pbm, .pce, pdd, .pde, .pdf, .pic, .pict, .pid, .pif, .pip, .pjp, .jpjeg, .pmd, .png, .pot, .ppm, .ppt, .prf, .prn, .ps, .psd, .psp, .pst, .pub, .qif, .qt, .r00, .r01, .r02, .r03, .r04, .r05, .ra, .ram, .rar, .raw, .rc, .rdi, .reg, .rm, .rpc, .rtf, .rtx, .sas, .sas7dbat, .sas7bvew, .sav, .sbl, .sbx, .scf, .scr, .sea, .sfx, .sh, .smi, .snd, .snp, .spo, .sps, .sql, .sqlite, .sqm, .stc, .std, .sti, .stm, .sv7, .sxc, .sxg, .sxm, .sxp, .sxw, .syd, .syo, .sys, .tab, .tar, .tif, .tiff, .tib, .tmb, .tmd, .tsv, .txt, .vb, .vbproj, .vbs, .vbx, .vcf, .vhd, .vm, .vsd, .vsi, .vsix, .vspscc, .vsscc, .vssscc, .wab, .wav, .wave, .wdb, .wer, .whb, .win, .wk1, .wk2, .wk3, .wk4, .wks, .wma, .wmv, .wms, .wmz, .wor, .wp, .wp2, .wp3, .wp4, .wpd, .wpp, .wps, .wpt, .prf, .wrj, .wrl, .wrz, .wtv, .wvf, .wvx, .xhtml, .xla, .xlam, .xlb, .xlc, .xld, .xlk, .xll, .xlm, .xlr, .xls, .xlsb, .xlsm, .xlsx, .xlt, .xltm, .xlv, .xlw, .xml, .xps, .xrp, .xsd, .xslt, .xspf, .xtf, .xxx, zip, .zipx, and .zix format files.

* * * * *